United States Patent [19]

Wojtech et al.

[11] 4,196,180

[45] * Apr. 1, 1980

[54] PURIFICATION OF PHOSPHORIC ACID BY MEANS OF ORGANIC SOLVENTS

[75] Inventors: Bernhard Wojtech, Bad Soden; Klaus P. Ehlers, Hürth-Knapsack; Wolfgang Scheibitz, Leverkusen, all of Fed. Rep. of Germany

[73] Assignee: Hoechst Aktiengesellschaft, Hurth Knapsack, Fed. Rep. of Germany

[*] Notice: The portion of the term of this patent subsequent to Dec. 7, 1993, has been disclaimed.

[21] Appl. No.: 881,516

[22] Filed: Feb. 27, 1978

Related U.S. Application Data

[63] Continuation of Ser. No. 715,627, Aug. 18, 1976, abandoned, which is a continuation of Ser. No. 482,987, Jun. 25, 1974, abandoned.

[30] Foreign Application Priority Data

Jul. 4, 1973 [DE] Fed. Rep. of Germany ....... 2334019

[51] Int. Cl.$^2$ ............................................. C01B 25/22
[52] U.S. Cl. ............................ 423/321 S; 423/321 R
[58] Field of Search ................ 423/167, 321 R, 321 S, 423/319, 320

[56] References Cited

U.S. PATENT DOCUMENTS 3,996,336 12/1976 Wojtech et al. ................. 423/321 S Primary Examiner—O. R. Vertiz
Assistant Examiner—Thomas W. Roy
Attorney, Agent, or Firm—Connolly and Hutz

[57] ABSTRACT

Contaminated phosphoric acid, particularly wet-processed phosphoric acid, is purified by extracting it from its aqueous solution by means of an organic solvent, which is immiscible or partially miscible with water and in which phosphoric acid is soluble, separating the phosphoric acid being dissolved in the organic solvent from extraction residue, and recovering the phosphoric acid from the organic solution.

The aqueous phosphoric acid is more particularly mixed in a reaction zone, in a ratio by volume within the range 1:0.3 to 1:30, with a solvent having a boiling point higher than that of water or higher than that of the resulting water solvent-azeotrope, the phosphoric acid/solvent-mixture is heated to temperatures between the boiling point of water or of the said azeotrope and that of the solvent until distillation of substantially all uncombined water originally present in the mixture, and residue and resulting anhydrous phosphoric acid solution in the organic solvent are separated.

14 Claims, 1 Drawing Figure

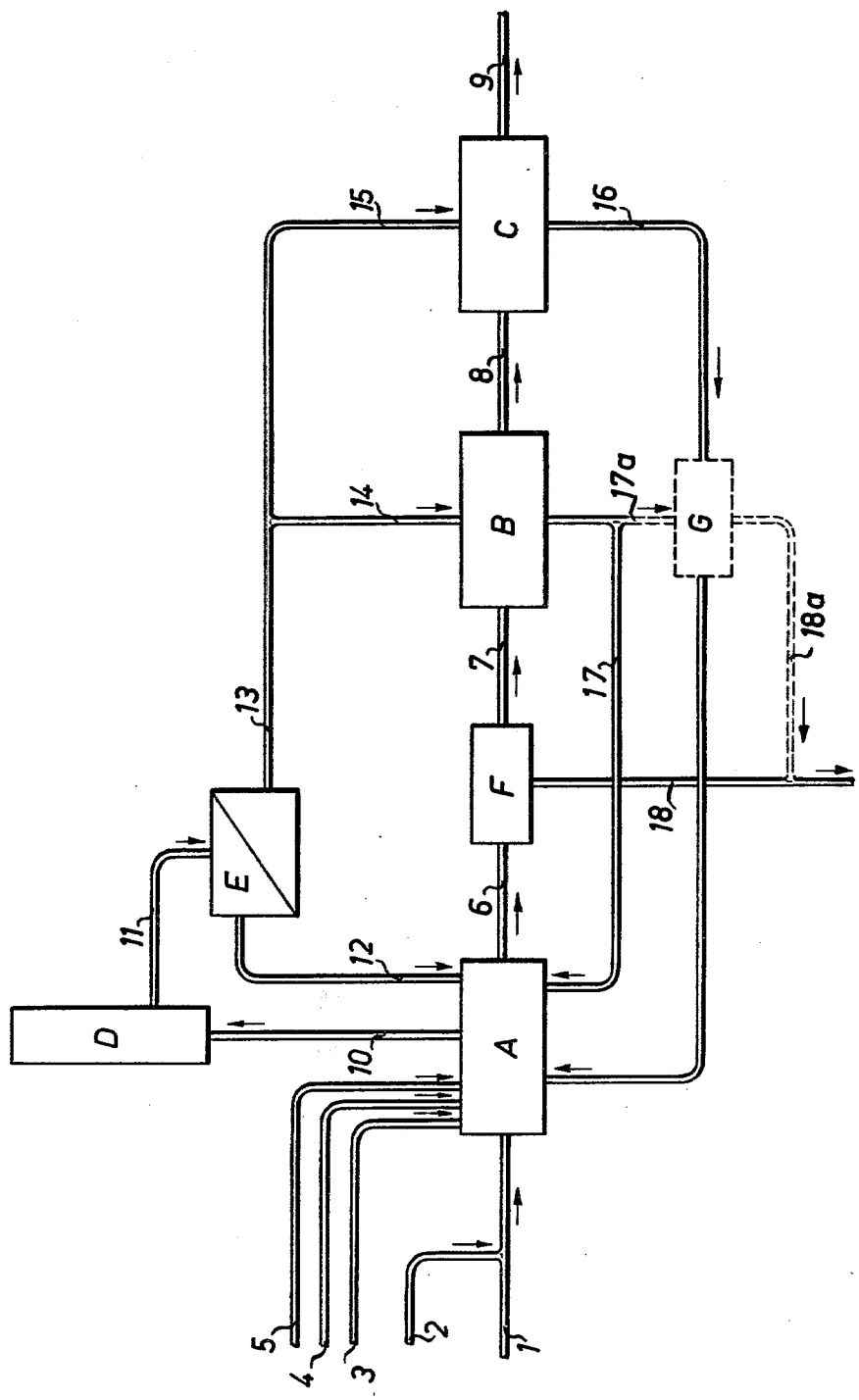

PURIFICATION OF PHOSPHORIC ACID BY MEANS OF ORGANIC SOLVENTS

This application is a continuation of application Ser. No. 715,627 filed Aug. 18, 1976 now abandoned which is a continuation of application Ser. No. 482,987 filed June 25, 1974 now abandoned.

The present invention relates to the purification of contaminated phosphoric acid, particularly of wet-processed phosphoric acid, by extracting it from its aqueous solution by means of an organic solvent, which is immiscible or partially miscible with water and in which phosphoric acid is soluble, separating the phosphoric acid being dissolved in the organic solvent from the extraction residue, and recovering the phosphoric acid from the organic solution.

Various processes have already been tried for the purification of phosphoric acid by means of organic solvents. The oldest process tried comprises subjecting crude phosphoric acid to stagewise treatment with water-insoluble solvents, such as water-saturated alcohols having from 4 to 5 carbon atoms, ethers, phosphoric acid esters and amines, wherein the phosphoric acid interchange is effected with the use of two true liquid phases. Owing to the generally very low distribution coefficient of phosphoric acid in such solvents, it is commonly necessary, with a view to obtaining high extraction rates, for them to be used in large quantities, and for the extraction to be carried out in a plurality of steps. In addition to this, it is sometimes necessary, for example in the process described in French Patent Specification No. 1,396,077, to add large quantities of extraction aids, such as $CaCl_2$ and HCl. These actually have beneficial effects upon the phosphoric acid interchange in favor of the organic phase. At the same time, however, the whole operation is rendered more difficult.

Solvents completely miscible with water, such as lower alcohols, esters or ketones, in which phosphoric acid is absorbed together with the total quantity of water present in the system, have also been tried heretofore in further processes, where the impurities are obtained in the form of solid or viscous material. One of the disadvantages encountered in these processes resides in the fact that the solvents, which have a poor selectivity, produce relatively impure extracts. The impurities in turn are completely miscible with water and therefore very difficult to purify and to separate distillatively into phosphoric acid and organic solvent, respectively.

Still further known processes use solvents partially miscible with water. These solvents can more particularly be used in a form in which they are partially saturated with water, where they show a behaviour comparable to that of solvents immiscible with water, or in anhydrous form, where they sometimes behave similarly to solvents completely miscible with water.

This has been described in the process of German Patent Specification No. 884,358, which however is not fully stisfactory. As taught therein, prior to using the solvent, it is necessary for it to be completely or partially dehydrated. In addition to this, the multi-stage extraction described produces a phosphoric acid containing extract having considerable proportions of water therein, which increases the power of the organic solvent for dissolving the impurities in crude phosphoric acid, especially iron sulfate and phosphate.

To free the extract from those impurities, it is necessary for it to be treated with a large excess of anhydrous solvent, or to be admixed with hygroscopic or non-hygroscopic substances which are actually soluble in water, but insoluble or little soluble in a ternary mixture comprising water, phosphoric acid and organic solvent.

It is also possible to effect the separation of water and impurities by subjecting the extract to an additional azeotropic distillation step, preferably after separation of the solvent extractant and addition of another organic solvent.

In accordance with the present invention, we now unexpectedly provide a process which is free from the disadvantages referred to hereinabove and which comprises mixing contaminated aqueous phosphoric acid in a reaction zone, in a ratio by volume within the range 1:0.3 and 1:30 or within the range 1:1 to 1:4, with a solvent having a boiling point higher than that of water or higher than that of the resulting water/solvent-azeotrope; heating the phosphoric acid/solvent-mixture to temperatures between the boiling point of water or of the said azeotrope and that of the solvent until distillation of substantially all uncombined water originally present in the mixture; and separating residue and resulting anhydrous phosphoric acid solution in the organic solvent.

The invention also provides for a sodium compound to be added to the phosphoric acid/solvent-mixture in the quantity necessary to have an atomic ratio of sodium to fluorine (this being fluorine which is contained in phosphoric acid) of up to 1:3, the preferred sodium compounds being sodium phosphate, sodium carbonate, sodium sulfate or sodium hydroxide solution.

A further preferred feature of the present invention comprises adding sodium sulfide, preferably in the form of a 20 weight % solution, and active carbon to the phosphoric acid/solvent-mixture. A still further preferred feature comprises admixing the contaminated phosphoric acid with up to about 8 weight %, based on $P_2O_5$, of sulfuric acid. The water or azeotropic mixture distilling off from the reaction zone should preferably be condensed, the azeotrope should be separated into water and solvent, the resulting water should be used for scrubbing the phosphoric acid solution in the organic solvent and/or for the re-extraction of phosphoric acid from that solution, and the solvent separated should be recyled to the reaction zone. Scrubbed raffinate which is obtained on scrubbing the solution can also be recycled to the reaction zone, or mixed with solvent under circulation. Impurities contained in the scrubbed raffinate precipitate in the form of solid material, are separated. Only after this has been done is the solvent recycled to the reaction zone. It is also possible for the separated phosphoric acid solution to be scrubbed with a fraction of purified phosphoric acid. This can be achieved with the use of phosphoric acid containing less $P_2O_5$ than a phosphoric acid which is in equilibrium with the organic phosphoric acid solution.

The liquid used for scrubbing the separated phosphoric acid solution can be employed in admixture for one or more alkali metal and/or ammonium compounds, which should be added in the quantities necessary to have up to about 0.016 mol of $Na_2O/100$ g of $P_2O_5$, or up to about 0.06 mol of $NH_3/100$ g of $P_2O_5$.

The organic solvents useful in the process of the present invention include more particularly: butanol, amyl alcohol, ethyl hexanol, dibutylether, methylisobutylether, butyl acetate or tributyl phosphate.

The phosphoric acid should preferably be dissolved in the organic solvent in a single step operation. This results in the formation of substantially completely anhydrous extracts, which are easy to separate from crude phosphoric acid impurities (these being obtained in the form of solid, commonly cristalline matter) by decantation, centrifugation or filtration. The separated extracts can be purified effectively in a counterflow operation with the use of water or phosphoric acid and, in the end, separated again with water into solvent and pure phosphoric acid.

The following is typical of the process of the present invention:

(1) The addition of a strong foreign acid, e.g. sulfuric acid, to crude phosphoric acid. This enables the proportion of free phosphoric acid therein (this being acid which is not chemically combined with cationic impurities) to be increased so that it is possible for up to 98% of the $P_2O_5$ in the crude acid to be extracted therefrom by means of the solvent.

(2) The bulk of foreign acid added, which increases the yield, is retained in the raffinate.

(3) The addition of Na-ions in the presence of sufficient quantities of silicic acid. This enables fluorine, which is in the solution, to be precipitated in the organic solution.

(4) The use of certain quantities of alkali metal or ammonium ions. This enables the selectivity of the solvent to be improved effectively, with respect to further impurities.

(5) The addition of certain precipitants, e.g. sodium sulfide to the phosphoric acid/solvent-mixture. This enables specific impurities, e.g. arsenic, which are soluble in the solvent used, to be transformed into insoluble matter.

(6) The addition of adsorbents, e.g. kieselguhr or active carbon, to the phosphoric acid/solvent-mixture. This enables the mixture to be freed effectively from organic impurities.

The above unexpected and highly desirable effects are primarily a result of the fact that the various reactions take place in a substantially or completely anhydrous system comprising solvent and phosphoric acid. As a result, the present invention compares very favorably with prior art methods in respect of the following points:

(1) The purification is substantially unaffected by the concentration of the crude phosphoric acid.

(2) The process avoids pretreatment of crude phosphoric acid, e.g. desulfatization, defluoration, which in turn entail complicated filtration.

(3) The phosphoric acid can be dissolved and the impurities can be precipitated in a single-step operation.

(4) The concentration of the feed phosphoric acid used does substantially not affect the formation of highly concentrated organic phosphoric acid solutions, from which relatively highly concentrated purified phosphoric acid awaiting no further concentration can be recovered.

(5) The concentration of the crude acid and the content of water in the solvent do substantially not affect the formation of high $P_2O_5$-yields.

The useful solvents include all those substances, which are immiscible or partially miscible with water, e.g. water saturated or anhydrous alcohols having from 4 to 6 carbon atoms, esters, ethers, phosphoric acid esters, and amines, which absorb $H_3PO_4$ and which have a boiling point higher than that of water or higher than that of the resulting water/solvent-azeotrope. In those cases in which a solvent immiscible with water is used, a situation may arise where pure water, a solvent/water-mixture or a solvent/water-azeotrope escapes upon mixing the components together at temperatures between the boiling point of water and that of the solvent. On the other hand, if use is made of a solvent partially miscible with water, an azeotrope normally goes over at temperatures between the boiling point of the azeotrope and that of the pure solvent. The azeotrope is cooled in a condenser with the resultant formation of two phases which are delivered to a separator and separated therein from one another.

BRIEF DESCRIPTION OF DRAWING

The process of the present invention will now be described with reference to the accompanying flow diagram.

DETAILED DESCRIPTION OF DRAWING

As can be seen crude phosphoric acid (coming from conduit 1) admixed with sulfuric acid of 96% strength (coming from conduit 2) and scrubbed raffinate (recycled though conduit 17) are intimately mixed with circulated solvent in a reactor A with rapid agitation at temperatures slightly lower than the boiling point of the solvent. The quantity of sodium compounds necessary to effect the precipitation of fluorine in the form of sodium silicofluoride are added though conduit 3, while agitation is continued. The useful sodium compounds include, for example sodium phosphate, sodium carbonate, sodium sulfate or sodium hydroxide solution. $Na_2S$ (coming from conduit 4), preferably in the form of a 20% solution and active carbon (coming from conduit 5) are added to effect the precipitation of heavy metals. Pure water or a water/solvent azeotrope goes over at 10. It is cooled in a condenser D or separated (azeotrope) into its components in a separator E. In this latter case, the solvent phase is recycled through conduit 12 into reactor A, whereas the aqueous phase travelling through conduit 13 is used partially for scrubbing crude organic phosphoric acid solution (coming from conduit 14) and partially for the reextraction of phosphoric acid flowing through conduit 15. Anhydrous organic phosphoric acid solution (conduit 6), which originates from the dehydrating dissolving action in reactor A, is delivered to separator F and freed therein from accompanying substances. Following this, it is delivered (conduit 7) together with a portion of water distilled off to a multi-stage counter-flow scrubbing stage B, where it is freed from residual dissolved impurities. The resulting scrubbed raffinate (flowing through conduit 17) is recycled to reactor A and extracted anew with solvent, together with phosphoric acid to undergo purification. Purified phosphoric acid is reextracted from the organic extract (conduit 8) by subjecting it to a multi-stage counter-flow scrubbing operation with water (conduit 15) and separated from solvent (conduit 16). The solvent, which has water contained in it, is recycled to reactor A and further phosphoric acid is absorbed therein, whereas purified phosphoric acid is concentrated, if necessary, or steam-treated to recover solvent fractions which may adhere thereto.

In accordance with a modified form of operation, the raffinate which is obtained on scrubbing the crude organic phosphoric acid solution with distilled water coming from the reactor, and which contains phosphoric acid portions together with residual impurities (these being relatively highly concentrated) is united, in a stage G, with the bulk of solvent under circulation, and recycled then to the reactor. In this case, at least 90% of the phosphoric acid contained in the scrubbed raffinate is dissolved. The impurities precipitate from the organic solution in the form of solid or viscous substances. They can be separated directly through conduit 18a, or recycled to reactor A, together with the solvent. The importance of this step resides in the fact that the high solvent/acid-ratio ensures a highly selective separation of phosphoric acid in the scrubbed raffinate from the impurities therein, which are thereby prevented from concentrating gradually in extractor 4, into which the solution is recycled.

A further modified form of operation comprises scrubbing the crude organic phosphoric acid solution with a portion of purified phosphoric acid. This is particularly advantageous in those cases in which the solvent is partially miscible with water, as the water then goes from the "scrubbing acid" into the dehydrated extract until it is saturated therewith. The acid so concentrated effects an additional $H_3PO_4$-concentration in the extract, due to existing equilibrium relations. As a further result, it is possible to use scrubbing acids more dilute than phosphoric acid which is in equilibrium with the organic phosphoric acid solution, without any loss of $H_3PO_4$ in the extract.

Irrespective of wether water or a phosphoric acid solution is the scrubbing agent, it is unexpectedly possible to increase the agent's purifying power by the addition of one or more alkali metal or ammonium compounds, which should preferably be added in the quantities necessary to have an alkali metal or ammonium concentration of about 0.016 mol $Na_2O$/100 g $P_2O_5$ or about 0.06 mol $NH_3$/100 g $P_2O_5$ in the scrubbed raffinate, which is recycled to reactor A. The use of quantities at which more than 10% of the $P_2O_5$ flowing through the main conduits are likely to be washed out, should be avoided.

The phosphoric acid can be reextracted from the solvent in known manner with the use of water or sodium hydroxide solution. In this latter case, it is only necessary to stir the organic phosphoric acid solution and the sodium hydroxide solution together, whereby the phosphoric acid is transformed quantitatively to the aqueous phase. In this manner, it is possible to produce sodium phosphate solutions which can directly be made into phosphates for use in detergent compositions. In those cases in which the reextraction is effected by means of an about 50 weight % sodium hydroxide solution, it is found that the solvents partially miscible with water contain less water than would correspond to the limit of saturation. This has favorable effects upon the consumption of energy in the dehydrating dissolving operation.

The loss of solvent in the process of the present invention is limited to those fractions which are removed together with precipitate originating from the dissolving operation. As the solvents are difficultly soluble in the almost solid salt conglomerate, there is only a minor loss of solvent, generally within the range 2 and 5 kg per metric ton of pure $P_2O_5$, depending on the particular solvent used in each case.

The loss of $P_2O_5$ depends on the quantity of cationic impurities in crude phosphoric acid. The pure phosphoric acid is extracted without any sinificant loss.

The following Examples illustrate the invention.

EXAMPLE 1

Crude phosphoric acid was prepared by subjecting Moroccan phosphate to a wet-processing treatment with sulfuric acid. After separation of the calcium sulfate, the acid was found to contain 28.5% of $P_2O_5$ and the following impurities in ppm (parts per million), based on $P_2O_5$:

| Fe | 5700 | F | 38 500 | V | 610 |
|---|---|---|---|---|---|
| Al | 5700 | $SO_4$ | 50 000 | Mn | 80 |
| Ca | 1700 | | | As | 25 |
| Mg | 6000 | | | | |
| $SiO_2$ | 1500 | | | | |

28 kg/h of acid and 2 kg/h of recycled scrubbed raffinate were placed in a reactor, 0.08 kg/h of active carbon, 0.434 kg/h of a 50% sodium hydroxide solution and 0.05 l/h of an about 20% sodium sulfide solution were added thereto, and the whole was mixed with thorough agitation, at temperatures between 130° and 135° C., with 39 kg/h of water-saturated $C_5$-alcohols (originating from an oxo-reaction) which were refluxed. This corresponded to a ratio by volume of phosphoric acid/alcohol of 1:2. 20 kg/h of water containing approximately 1% of alcohol were distilled off. The mixture so made consisted of a substantially anhydrous alcoholic phosphoric acid solution and solid fine-particulate raffinate. It was separated in a separator. 2.2 kg/h of precipitate was removed and 47.4 kg of the alcoholic crude extract was scrubbed with 4.8 kg/h of the water distilled off in a system comprising eight mixers provided with settling tanks. 50.2 kg/h of a very pure extract and 2 kg/h of scrubbed raffinate were obtained. The latter was recycled to the reactor while the extract was delivered to a rotary disc column comprising eight theoretical trays and reextracted therein by means of 15.2 kg/h of the water distilled off. This gave 26.7 kg/h of pure phosphoric acid containing 29% of $P_2O_5$ and 38.7 kg/h of water-saturated alcohol, which was circulated together with a further 0.3 kg/h of residual alcohol expelled from the pure acid, for absorption of further phosphoric acid therein. The purified phosphoric acid can be used directly, or after concentration. 3% of $P_2O_5$ was lost. The purified gas was analyzed and found to contain the following impurities in ppm, based on $P_2O_5$:

| Fe | 15 | V | 5 | F | 100 |
|---|---|---|---|---|---|
| Al | 50 | Mn | 1 | $SiO_2$ | 100 |
| Ca | 20 | As | 1 | $SO_4$ | 500 |
| Mg | 5 | | | | |

EXAMPLE 2

Crude phosphoric acid was prepared by subjecting Negev phosphate to a wet-processing treatment with sulfuric acid. The acid so made contained 49% of $P_2O_5$ and the following impurities in ppm, based on $P_2O_5$:

| Fe | 3600 | V | 375 | F | 2500 |
|---|---|---|---|---|---|
| Al | 3900 | Mn | 19 | $SiO_2$ | 350 |
| Ca | 40 | As | 17 | $SO_4$ | 75000 |
| Mg | 6000 | | | | |
| Ti | 280 | | | | |

10.3 l/h of acid admixed with 0.05 kg/h of active carbon was placed in an agitator vessel, 1.3 l/h of recycled scrubbed raffinate was added and the whole was intimately mixed at 130° C. with 47.2 l/h of a water-saturated C5-alcohol mixture originating from an oxo-reaction, while adding 0.05 l/h of an about 20% Na2S-solution and 0.3 l/h of a 30% aqueous ammonia solution. 9 l/h of water was distilled off and solid phase material and liquid phase material were separated from one another. 1.7 kg/h of precipitated raffinate containing 0.16 kg/h of $P_2O_5$ and 49.4 l/h of a crude alcoholic phosphoric acid solution were obtained. The solution was saturated with 5.9 l/h of the water distilled off and scrubbed in a system comprising eight mixers provided with settling tanks with 1.3 l/h of recycled phosphoric acid containing 36% of $P_2O_5$. A raffinate containing residual impurities and 55.3 l/h of a very pure extract were obtained. The raffinate was recycled to the agitator vessel and the extract was delivered to a system comprising eight mixers provided with settling tanks, wherein it was scrubbed with 8.7 l/h of water flowing countercurrently with respect thereto. The water originated partially from the water distilled off from the agitator vessel and partially from the concentration of the pure acid. This gave 17.1 l/h of pure phosphoric acid containing 36% of $P_2O_5$. At the same time, there was recovered 46.9 l/h of water-saturated alcohol, which was combined with 0.3 l/h of residual alcohol (this being alcohol recovered by fractional distillation during the concentration of the pure acid) and the whole was circulated for the absorption of further phosphoric acid therein. A 1.3 l/h portion of the pure acid was used for scrubbing the extract and the balance was concentrated to 50%. 2% of $P_2O_5$ was lost, based on the crude $P_2O_5$. The purified acid was analyzed and found to contain the following impurities in ppm, based on $P_2O_5$:

| Fe | 10 | SiO2 | 100 | V  | 5 | Mg | 5  |
|----|----|------|-----|----|---|----|----|
| Al | 50 | F    | 100 | Mn | 1 | Ti | 10 |
| Ca | 20 | SO4  | 50  | As | 1 |    |    |

EXAMPLE 3

The efficiency of various solvents in the purification of wet-processed phosphoric acid was tested in a series of tests under comparable conditions. The test acid was crude phosphoric acid prepared by subjecting Kola phosphate to a wet-processing treatment with sulfuric acid. After separation of the calcium sulfate, the crude acid contained 28.2% of $P_2O_5$ together with 1.0% of sodium, 0.64% of iron and 0.68% of sulfate and further impurities, based on $P_2O_5$. The purifying efficiency was identified along the iron and sulfate concentrations. Iron and sulfate are impurities typical of wet-processed phosphoric acid and their behavior permits conclusions to be drawn in respect of further undesirable impurities. The tests were made on the first step operation, the dehydration and dissolution of phosphoric acid in the solvent. The step of scrubbing the extract and the reextraction were not specifically tested. This takes place in the manner described in Examples 1 and 2 disclosing the principle underlying the purification. The extraction was effected at a ratio by volume of solvent/phosphoric acid of 2:1, to have comparable conditions. Only in those cases in which amines were used for the extraction was it necessary to increase the ratio so as to avoid too heavy an increase in viscosity. In those cases, in which amyl alcohol was used, tests were made on the 2:1 ratio, on a 1:1 ratio and on a 1:2 ratio.

The extraction was effected continuously. To this end, the individual components were poured together in the ratio by volume indicated. Water was distilled off at boiling temperature at atmospheric pressure and solvent fractions, coming from the separating condensers, were continually recycled to the extractor. After removal of the water, the anhydrous extract was cooled and the resulting solid precipitate was separated. Typical representatives of the individual extractants are the following: n-butanol; n-amyl alcohol; 2-ethylhexanol; methylisobutylketone; dibutylether; butyl acetate; n-tributylphosphate (50% by volume in n-octane) and tridodecylamine (50% by volume in toluene).

The extracts were analyzed and the results indicated in the following Table were obtained.

| Ratio by volume solvent/phosphoric acid | | Wgt. % $P_2O_5$ in extract | Fe, based on $P_2O_5$ | SO4, based on $P_2O_5$ |
|---|---|---|---|---|
| 2:1 | n-Butanol | 14.7% | 590 ppm | 180 ppm |
| 2:1 | n-Amyl alcohol | 15.3% | 0.13% | 100 ppm |
| 1:1 | n-Amyl alcohol | 23.2% | 0.24% | 100 ppm |
| 1:2 | n-Amyl alcohol | 31.1% | 0.42% | 603 ppm |
| 2:1 | Ethylhexanol | 12.7% | 611 ppm | |
| 2:1 | Dibutylether | 12.1% | 0.15% | |
| 2:1 | Methylisobutylketone | 14.5% | 0.11% | 713 ppm |
| 2:1 | Butyl acetate | 13.7% | 990 ppm | 115 ppm |
| 2:1 | Tributyl phosphate | 14.3% | 0.14% | 200 ppm |
| 7.5:1 | Tridodecylamine | 5.1% | 0.48% | not identified |

We claim:

1. In a process for purifying an impure aqueous phosphoric acid solution containing dissolved impurities by mixing in a mixing zone the impure aqueous phosphoric acid solution with an organic solvent, which is immiscible or partially miscible with water and in which phosphoric acid is soluble, in a ratio by volume of the said phosphoric acid solution to the solvent within the range 1:0.3 to 1:30; the said organic solvent having a boiling point higher than that of water or of any resulting water/solvent azeotrope; the improvement which comprises mixing together the said phosphoric acid solution with the said organic solvent in a single-step operation, heating the aqueous phosphoric acid/solvent mixture to the distilling temperature of water; maintaining the said temperature for as long as necessary to distil off substantially all uncombined water originally present in the said mixture and obtain in the mixing zone an anhydrous organic phosphoric acid solution together with a solid residue consisting of impurities originally present in the said impure aqueous phosphoric acid solution being not dissolved by the said anhydrous organic phosphoric acid solution; condensing any water/azeotrope formed and separating it into water and saturated organic solvent and recycling the saturated organic solvent so obtained to the mixing zone; separating the anhydrous organic phosphoric acid solution from the said residue by decantation, centrifugation or filtration, and recovering pure phosphoric acid from the separated organic phosphoric acid solution.

2. The process as claimed in claim 1, wherein the impure aqueous phosphoric acid to be purified and the organic solvent are mixed together in a ratio by volume within the range 1:1 and 1:4.

3. The process as claimed in claim 1, wherein a sodium compound selected from the group consisting of sodium phosphate, carbonate, sulfate and hydroxide is added to the aqueous phosphoric acid/organic solvent mixture in the presence of sufficient amounts of silicic acid and in such a quantity to set in the mixture an atomic ratio of sodium to fluorine contained in the impure aqueous phosphoric acid solution of up to 1:3, for precipitating fluorine.

4. The process as claimed in claim 1, wherein sodium sulfide is added to the aqueous phosphoric acid/organic solvent mixture to precipitate metallic impurities contained in the impure aqueous phosphoric acid.

5. The process as claimed in claim 1, wherein the sodium sulfide is added in the form of a 20 weight % solution.

6. The process as claimed in claim 1, wherein kieselguhr or active carbon are added to the aqueous phosphoric acid/organic solvent mixture to adsorb organic impurities contained in the impure aqueous phosphoric acid.

7. The process as claimed in claim 1, wherein the anhydrous organic phosphoric acid solution after being separated from the residue is scrubbed with purified phosphoric acid to which alkali metal or ammonium compounds are added in such a quantity to set therein an alkali metal or ammonium concentration of about 0.016 mol alkali metal oxide/100 g $P_2O_5$ or up to about 0.06 mol $NH_3$/100 g $P_2O_5$.

8. The process as claimed in claim 1, wherein the water distilled off from the mixing zone is condensed.

9. The process as claimed in claim 1, wherein the anhydrous organic phosphoric acid solution after being separated from the residue is scrubbed with a scrubbing liquid selected from the group consisting of water and purified phosphoric acid.

10. The process as claimed in claim 1, wherein the organic solvent is butanol, amyl alcohol, ethyl hexanol, dibutylether, methylisobutylketone, butyl acetate or tributyl phosphate.

11. The process as claimed in claim 1, wherein water distilled off from the mixing zone is recycled and used to scrub said anhydrous organic phosphoric acid solution.

12. The process as claimed in claim 11, wherein raffinate resulting from scrubbing the anhydrous organic phosphoric acid solution is recycled to the mixing zone.

13. The process as claimed in claim 11, wherein raffinate resulting from scrubbing the anhydrous organic phosphoric acid solution is combined with recycled organic solvent, solid impurities precipitating from the scrubbed raffinate are separated, and thereafter the solvent is fed into the mixing zone.

14. The process as claimed in claim 11, wherein the anhydrous organic phosphoric acid solution separated is scrubbed with purified phosphoric acid containing less $P_2O_5$ than a phosphoric acid being in equilibrium with the said solution.

* * * * *